(12) United States Patent
Noetzelmann et al.

(10) Patent No.: US 10,606,562 B2
(45) Date of Patent: Mar. 31, 2020

(54) METHOD AND SYSTEM FOR GENERATING PLC CODE WITH A CONNECTIVITY MODEL

(71) Applicant: Siemens Aktiengesellschaft, Munich (DE)

(72) Inventors: Oswin Noetzelmann, Diamond Bar, CA (US); Rami Reuveni, Irvine, CA (US); Attila Labas, Rancho Mission Viejo, CA (US); Marine Durel, Long Beach, CA (US); Andreas Wannagat, Neuss (DE); Victor Robert Hambridge, Fountain Valley, CA (US); Andrew Dylla, Anaheim Hills, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/577,535

(22) PCT Filed: Jun. 4, 2015

(86) PCT No.: PCT/US2015/034167
§ 371 (c)(1),
(2) Date: Nov. 28, 2017

(87) PCT Pub. No.: WO2016/195690
PCT Pub. Date: Dec. 8, 2016

(65) Prior Publication Data
US 2018/0136910 A1    May 17, 2018

(51) Int. Cl.
*G06F 8/30*    (2018.01)
*G05B 19/042*    (2006.01)
(Continued)

(52) U.S. Cl.
CPC ........... *G06F 8/30* (2013.01); *G05B 19/0426* (2013.01); *G05B 19/056* (2013.01);
(Continued)

(58) Field of Classification Search
CPC ............................. G06F 8/30; G05B 19/0426
(Continued)

(56) References Cited

U.S. PATENT DOCUMENTS 6,643,555 B1 * 11/2003 Eller .................. G05B 19/0426
700/17
7,356,773 B1 * 4/2008 Barraclough ........... G06F 9/453
715/762

(Continued)

OTHER PUBLICATIONS

PCT International Search Report dated Dec. 21, 2015; Application No. PCT/US2015/034167; Filing Date: Jun. 4, 2015; 11-pages.

*Primary Examiner* — Duy Khuong T Nguyen
*Assistant Examiner* — Theodore E Hebert

(57) ABSTRACT

The preferred embodiments described below include methods, systems and computer readable media for generating programmable logic controller (PLC) code based on a connectivity model in a multidisciplinary engineering system. The connectivity model provides interfaces 613 and 617 and connections 619 between various aspects of the multidisciplinary engineering system to provide engineering data, code scripts, executables, calls and other information that is used to generate PLC code. Code generation rules 621 are employed utilizing the engineering data, code scripts, executables, calls and other information received using the connectivity model to generate PLC code.

19 Claims, 13 Drawing Sheets

(51) Int. Cl.
    *G05B 19/418*    (2006.01)
    *G06F 8/71*      (2018.01)
    *G05B 19/05*     (2006.01)
    *G06F 8/20*      (2018.01)

(52) U.S. Cl.
    CPC ......... *G05B 19/41845* (2013.01); *G06F 8/71* (2013.01); *G05B 2219/13116* (2013.01); *G05B 2219/23293* (2013.01); *G06F 8/20* (2013.01); *Y02P 90/16* (2015.11)

(58) Field of Classification Search
    USPC .......................................................... 717/106
    See application file for complete search history.

(56) References Cited

U.S. PATENT DOCUMENTS

| | | | |
|---|---|---|---|
| 2002/0073094 A1* | 6/2002 | Becker | G05B 19/0426 |
| 2003/0061274 A1* | 3/2003 | Lo | G05B 19/056 |
| | | | 709/203 |
| 2013/0055196 A1* | 2/2013 | Canedo | G06F 8/30 |
| | | | 717/104 |
| 2018/0136910 A1* | 5/2018 | Noetzelmann | G05B 19/0426 |

\* cited by examiner

METHOD AND SYSTEM FOR GENERATING PLC CODE WITH A CONNECTIVITY MODEL

This application is a national phase filing under 35 U.S.C. § 371 of International Patent Application No. PCT/US2015/034167, filed Jun. 4, 2015, which is incorporated herein by reference in its entirety.

BACKGROUND

The present embodiments relate to multidisciplinary engineering systems. A multidisciplinary engineering system is a system that integrates multiple engineering disciplines, such as design engineering, electrical engineering, mechanical engineering, automation engineering, project management and the like, and allows engineers, technicians and managers from various disciplines to work on common or connected data. For example, factory designers work together with mechanical engineers, electrical engineers, automation engineers and managers to plan a new production line for a car door assembly. In a multidisciplinary engineering system, each discipline has its own representation of data. For example, the same device will be represented differently in each discipline, and different data regarding the device is stored depending on the discipline.

SUMMARY

By way of introduction, the preferred embodiments described below include methods, systems and computer readable media for generating programmable logic controller (PLC) code based on a connectivity model in a multidisciplinary engineering system. The connectivity model provides interfaces and connections between various aspects of the multidisciplinary engineering system to provide engineering data, code scripts, executables, calls and other information that is used to generate PLC code. Code generation rules are employed utilizing the engineering data, code scripts, executables, calls and other information received using the connectivity model to generate PLC code.

In a first aspect, a method is provided for generating programmable logic controller (PLC) code based on a connectivity model in a multidisciplinary engineering system. A server stores a code model for generating the PLC code and a connectivity model for the multidisciplinary system. The connectivity model includes a plurality of interfaces in the multidisciplinary engineering system. Each of the interfaces is associated with the code model or engineered data represented in an engineering application for a different engineering discipline with a different role in the multidisciplinary engineering system. The connectivity model also includes connection rules for each of the plurality of interfaces and connections between the interfaces satisfying the connection rules. The plurality of interfaces transmit or receive engineered data to and from other interfaces according to the connections. The code model receives the engineered data represented in the engineering application based on the connectivity model. The server generates PLC code using the code model based on the received engineered data and a code generation rule. The server transmits the generated PLC coded to a computer over a network.

In a second aspect, a multidisciplinary engineering system is provided for generating programmable logic controller (PLC) code based on a connectivity model. A server is configured to store a code model for generating PLC code and the connectivity model for the multidisciplinary system. The connectivity model includes a plurality of connection points in the multidisciplinary engineering system. Each of the connection points is associated with the code model or engineered data represented in an engineering application for a different engineering discipline with a different role in the multidisciplinary engineering system. The connectivity model also includes connection rules for each of the plurality of connection points and connections between the connection points satisfying the connection rules. The plurality of connection points transmit or receive engineered data to and from other connection points according to the connections. The server is configured to receive the engineered data represented in the engineering application in the code model based on the connectivity model. A workstation configured to generate PLC code using the code model, based on the received engineered data and a code generation rule.

In a third aspect, a method is provided for generating programmable logic controller (PLC) code based on a connectivity model in a multidisciplinary engineering system. A server stores a plurality of code models for PLC hardware. The server identifies at least one of the plurality code models for receiving PLC code. The server prepares the identified code models for code generation. The server generates PLC code for the identified code models. The server stores the generated PLC code in the identified code models and exports the generated PLC from the server to the PLC hardware.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EXEMPLARY EMBODIMENTS

The following embodiments describe a solution for generating programmable logic controller (PLC) code based on a connectivity model in a multidisciplinary engineering system. The system and method allow engineers and other users to generate code for programmable logic controllers based on a connectivity model that utilizes ports and connections in the multidisciplinary engineering system. The system and method allows for reuse of engineered data and data structures in a flexible and efficient way. The system and method identify potential connectivity points, establishes connections and provides feedback about potentially missing connections. Additionally, the system and method provide tools for engineering the code generation process in the context of a structured engineering system (e.g., a multidisciplinary engineering system that implements IEC 81346).

In an engineering project, an automation design application utilizes code entities (also referred to herein as code models) to generate PLC code. The automation design application enriches the code entities by receiving code, engineered data and other information from the multidisciplinary system. The type and form of the code, engineered data and other information received is dependent on the connectivity model for the multidisciplinary engineering system. The code, engineered data and other information received from the multidisciplinary engineering system allows the automation design application to dynamically generate the PLC code for the code entities using code generation rules.

Code generation with a connectivity model may result in reduced engineering efforts because a code generation system may allow users to prepare code for various different engineering contexts in a multidisciplinary engineering system, and may reduce the time and effort expended by engineers. Code generation with a connectivity model may result in shorter time to market because reduced engineering efforts may result in a shorter time for the overall engineering process. Code generation with a connectivity model may enhance the quality of the output of the overall engineering process by avoiding human errors in a manual workflows and by detecting errors using the status of ports and connections in the multidisciplinary engineering system. Code generation with a connectivity model may result in increased performance because dependencies to external information may be clustered. Greater integration with existing engineering applications may be provided because it is possible to adapt this system and method to existing and future multidisciplinary engineering systems. The aforementioned advantages may result in investment savings and reduced risks, especially for large engineering companies that use set processes and standards. Some example industries that may benefit from the disclosed embodiments are automobile, logistics and machine building. However other industries may also benefit from the disclosed embodiments.

Figure 1:
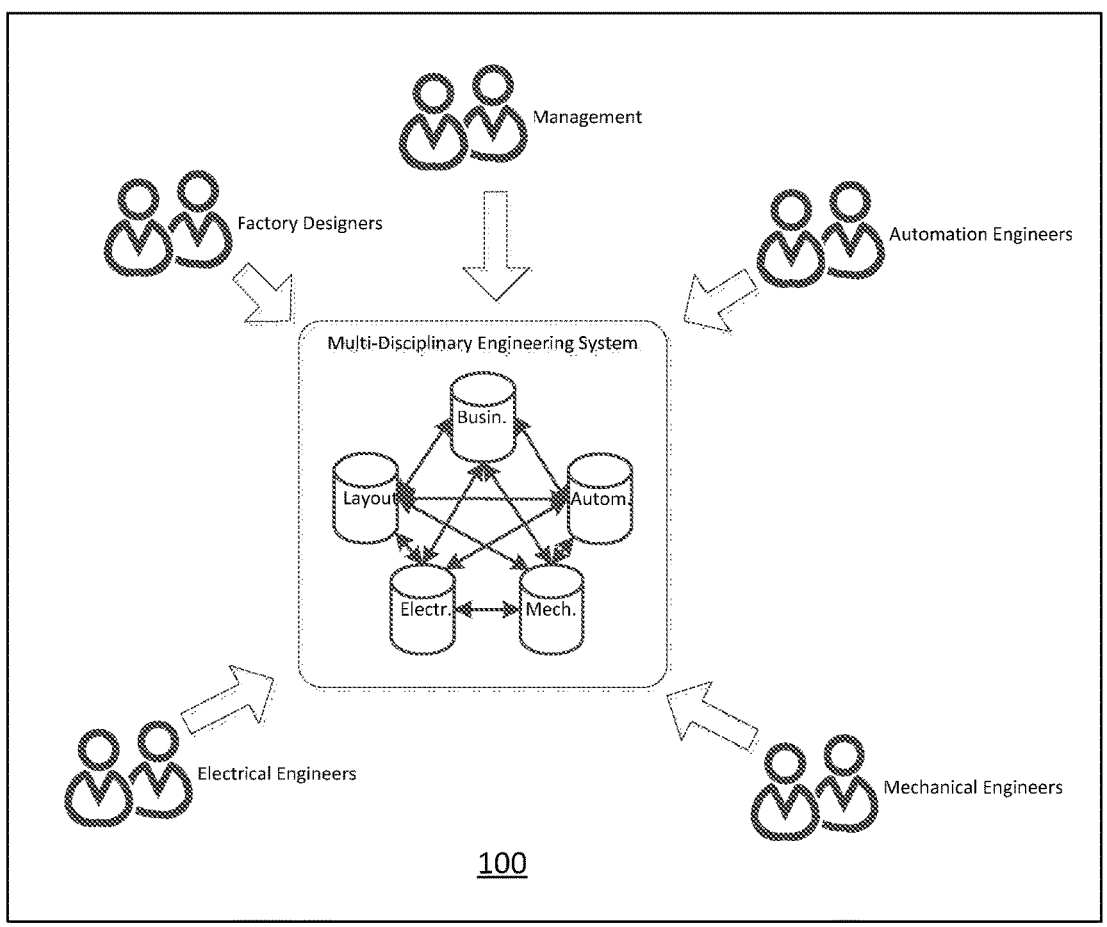
FIG. 1 illustrates an example of a multidisciplinary engineering system.

FIG. 1 illustrates an example of a multidisciplinary engineering system. The multidisciplinary engineering 100 includes a server and workstations. The server and/or workstations in the multidisciplinary engineering system 100 include engineering applications for various engineering disciplines. The engineering applications are directed to layout design, electrical design, mechanical design, automation design, and business functions. The engineering applications correspond to engineering disciplines, such as factory design, electrical engineering, mechanical engineering, automation engineering, and project management. Engineered devices and other objects are represented in the engineering applications in the multidisciplinary system, such as a conveyor on a factory assembly line. Each engineering application presents data differently, in a manner suited for the specific engineering discipline. Additional, different or fewer engineering applications and engineering disciplines may be provided. Alternatively, at least one of the engineering applications is directed to two or more engineering disciplines within a single application. Various engineers, designers, technicians, managers and other users access the engineering applications to complete tasks on the project. For example, in the context of an automobile factory, various engineers, designers and project managers plan a new production line for a car door assembly.

Figure 2:
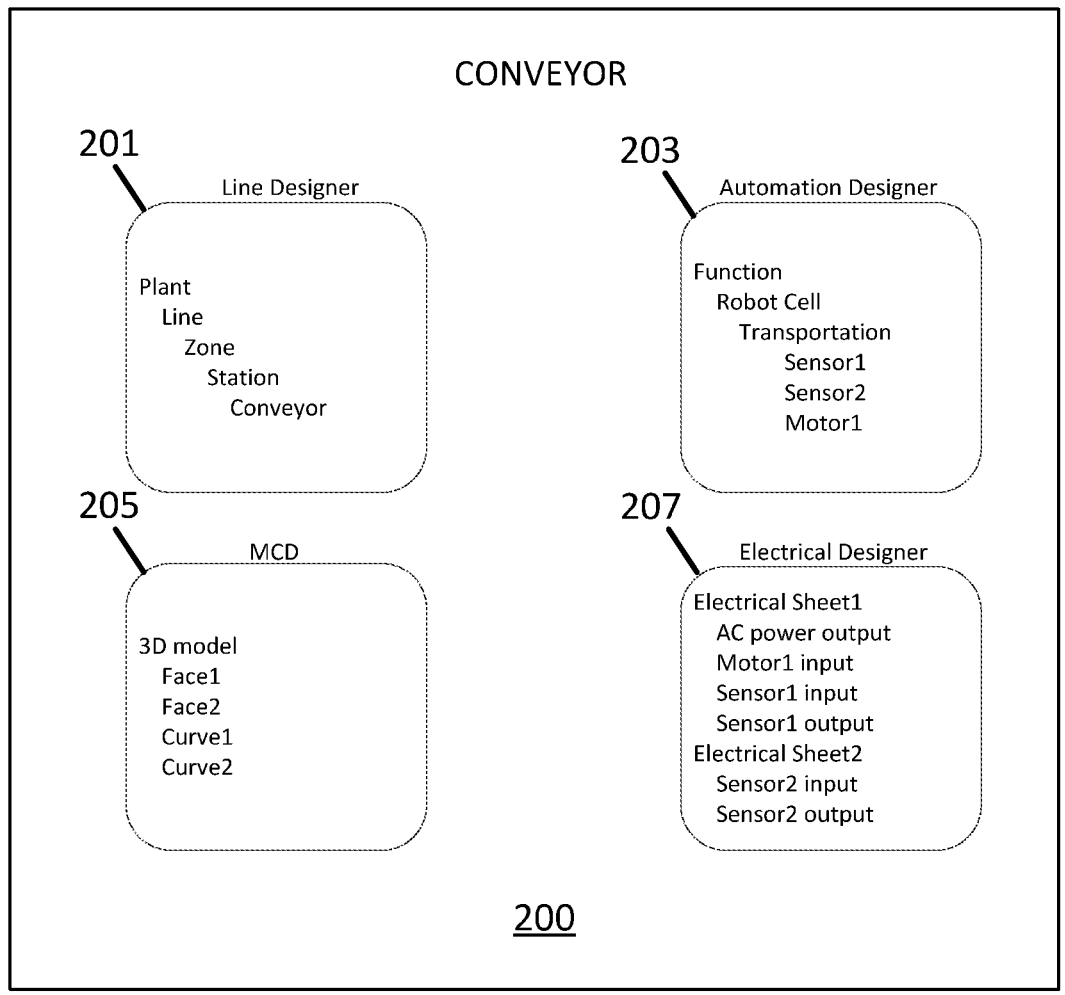
FIG. 2 illustrates an example of engineered data in a multidisciplinary system.

FIG. 2 illustrates an example of engineered data in a multidisciplinary system. In this example, a new production line includes the conveyor. Each engineering application 201, 203, 205 and 207 has a role with respect to the conveyor, and will have a different representation of data associated with the conveyor that is specific to the engineering application. Referring to FIG. 2, factory designers utilize a layout design application, such as line designer application 201, to plan the layout of the new production line, including the conveyor. The line designer application 201 displays information about the new production line, including the plant, line, zone and station where the conveyor will be placed. Automation engineers utilize the automation designer application 203 to plan the conveyor automation. Automation designer application 203 displays the function and robot cell of the conveyor, and the components of the conveyor that will be automated, including sensor1, sensor2 and motor1. Mechanical engineers utilize a mechanical design application, such as MCD 205, to plan the mechanical aspects of the conveyor. MCD 205 includes information about a three-dimensional (3D) model of the conveyor, including face1, face2, curve1 and curve2. Electrical engineers utilize the electrical designer application 207 to plan the electrical inputs and outputs for the conveyor. Electrical designer application 207 displays electrical information that will be provided to technicians installing the conveyor. Electrical sheet 1 includes an AC power output, motor1 input, sensor1 input and sensor1 output. Electrical sheet 2 includes a sensor2 input and sensor2 output. Additional and different roles and/or information may be provided.

The production line may incorporate one or more programmable logic controllers. For example, the automation engineer adds a programmable logic control to control the conveyor. For the programmable logic controller to operate, inputs, outputs, and code for processing the inputs to generate the outputs is to be created. The code for the operation of the programmable logic controller may be based on information from more than one engineering discipline, such as the automation designer application, the line designer application and the electrical designer application. For example, engineering data and code from the automation designer may be reused to generate code for local functions of the target PLC. In this example, code from another PLC may be reused with modifications, such as dynamically updating the code with input/output addresses associated with the target PLC. Alternatively, the code in the target PLC may need to be updated with external code provided by a supplier or other third party. In another example, engineering data may be provided from the line designer and electrical designer applications to accomplish for broader functionality of the target PLC with other equipment in the production line. For example, engineering data from the line designer may be used to facilitate the flow of materials within the plant. When materials flow from one conveyor to another, engineering data from the up-line conveyor may be reused by the PLC controlling the down-line conveyor, such as the length and speed data of the up-line conveyor from the line designer application. Additionally, handshakes between the PLCs may be facilitated by reusing engineering data from the electrical designer application, such as bus addresses. Other engineering data from the engineering applications may be reused.

Figure 3:
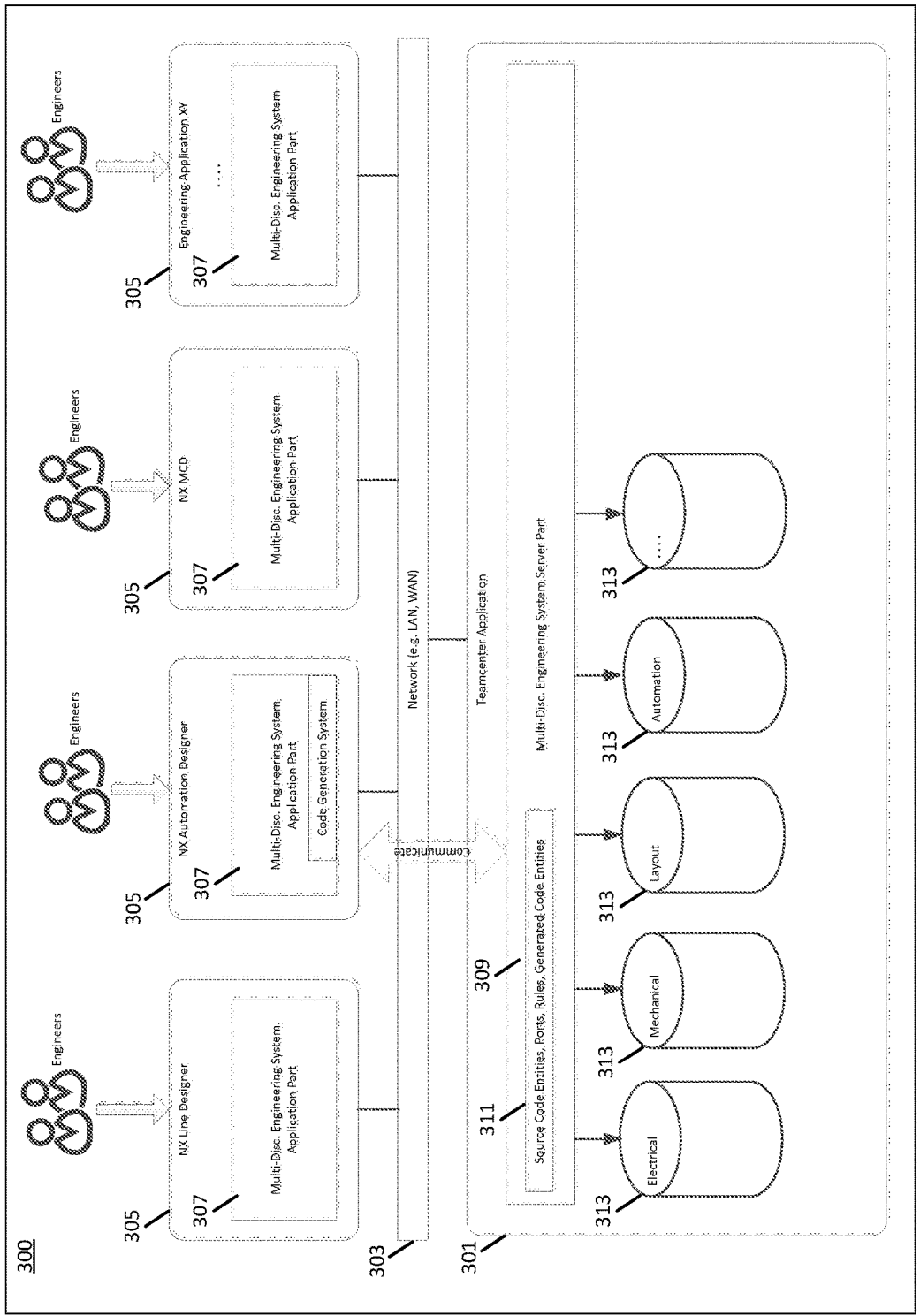
FIG. 3 illustrates an example implementation of a multidisciplinary system.

FIG. 3 illustrates an example implementation of a multidisciplinary system in an engineering environment. In one embodiment, the multidisciplinary system is the Siemens Engineering Environment utilizing Siemens engineering tools and applications. Additional implementations may be provided in the same or other engineering systems.

The multidisciplinary system 300 includes a server 301, a network 303 and workstations 305. Additional, different, or fewer components may be provided. For example, more or fewer workstations 305 are used. As another example, additional networks and/or servers are used. In yet another example, a separate database managed or accessed by the server 301 or the workstations 305 is provided. Alternatively, the server 301 and the workstations 305 are directly connected, or implemented on a single computing device. Additionally, the server 301 can be a single physical server, a system of servers, a virtual server, as used in cloud computing and virtualization scenarios, or a system of virtual servers.

The server 301 includes a Teamcenter application 309 with source code entities, port information, connectivity rules, code generation rules, generated code entities and other information (collectively, 311) and databases 313. The Teamcenter application 309 allows a user to add, delete or modify source code entities, port information, connectivity rules, code generation rules, generated code entities and other information (collectively, 311) stored on server 301. The Teamcenter application 309 stores the source code entities, port information, connectivity rules, code generation rules, generated code entities and other information (collectively, 311) in the databases 313. Additional, different, or fewer components may be provided. For example, the Teamcenter application 309 may be uploaded to, and executed by, a processor in server 301. Likewise, processing strategies may include multiprocessing, multitasking, parallel processing and the like. The server 301 is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the server 301 includes one or more processors in a network.

The Teamcenter application 309 also serves as a metamodel based repository system and data platform for the engineering applications 307 by storing data received from the engineering applications 307 in the databases 313. The data received from the engineering applications 307 includes project specific data, such as object and parameter names, parameter values, device specifications, and/or other information. The Teamcenter application 309 operates as a multidisciplinary system server that communicates information to/from the engineering applications 307 over the network 303. The databases 313 are referenced by the connectivity model when generating PLC code. The Teamcenter application 309 also stores a library of application objects and the links between instantiated library objects.

The multidisciplinary system 300 includes workstations 305 with engineering applications 307 corresponding to various engineering disciplines and engineering roles. For example, NX Line Designer is a layout design application, such as the line designer application 201, NX Automation Designer is an automation engineering application, such as automation designer application 203, NX MCD is a three-dimensional (3D) modeling application, such as MCD 205, and NX Electrical Designer is an electrical engineering application, such as electrical designer application 207. Different or fewer engineering applications, engineering disciplines and engineering roles may be provided. A different engineering application is referred to as Engineering Application XY, corresponding to any other engineering discipline XY. Various engineers, designers, technicians, managers and other users access the engineering applications, such as line design engineers, automation engineers, MCD engineers and XY engineers. Workstations 305 with engineering applications 307 form a multidisciplinary engineering system, such as multidisciplinary engineering system 100.

The NX Automation Designer workstation 305 includes a NX Automation Designer Application 307. The NX Automation Designer Application 307 includes a code generation system that receives code entities, port information, connectivity rules, code generation rules, generated code entities and other information (collectively, 311) that is stored on the server 301. The code generation system generates PLC code based on the received information 311. Alternatively, the code generation system may be hosted on the server 301, with the server 301 generating PLC code based on the information 311 stored on the server 301, or on another workstation 305.

The multidisciplinary system 300 includes a network 203. The network 203 is a wired or wireless network, or a combination thereof. The network 203 is configured as a local area network (LAN), wide area network (WAN), intranet, internet or other now known or later developed network configurations. Any network or combination of networks for communicating between the role-specific applications and the server for hosting the templates, data, or other information of the engineering system may be used.

Figure 4:
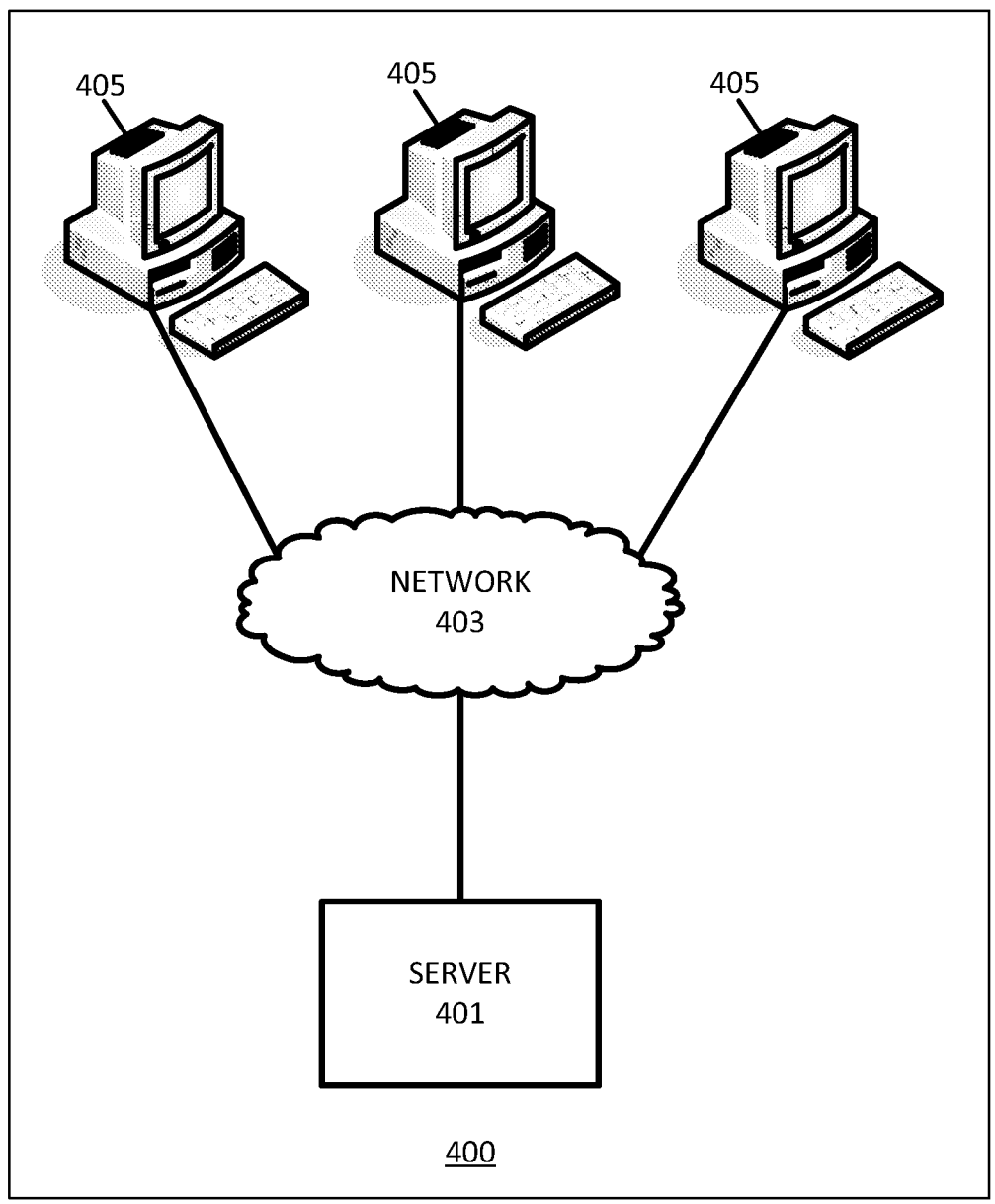
FIG. 4 illustrates an embodiment of a system for generating PLC code with a connectivity model.

FIG. 4 illustrates an embodiment of a system for generating PLC code with a connectivity model. The multidisciplinary system 400 includes a server 401, a network 403 and workstations 405. Additional, different, or fewer components may be provided. For example, additional or fewer workstations 405 are used. As another example, additional networks and/or servers are used. In yet another example, separate databases are managed and/or accessed by the server 401 and workstations 405. Server 401 is a server computer platform having hardware such as one or more central processing units (CPU), a system memory, a random access memory (RAM) and input/output (I/O) interface(s). The server 401 is implemented on one or more server computers connected to network 403. Additional, different or fewer server components may be provided.

Figure 5:
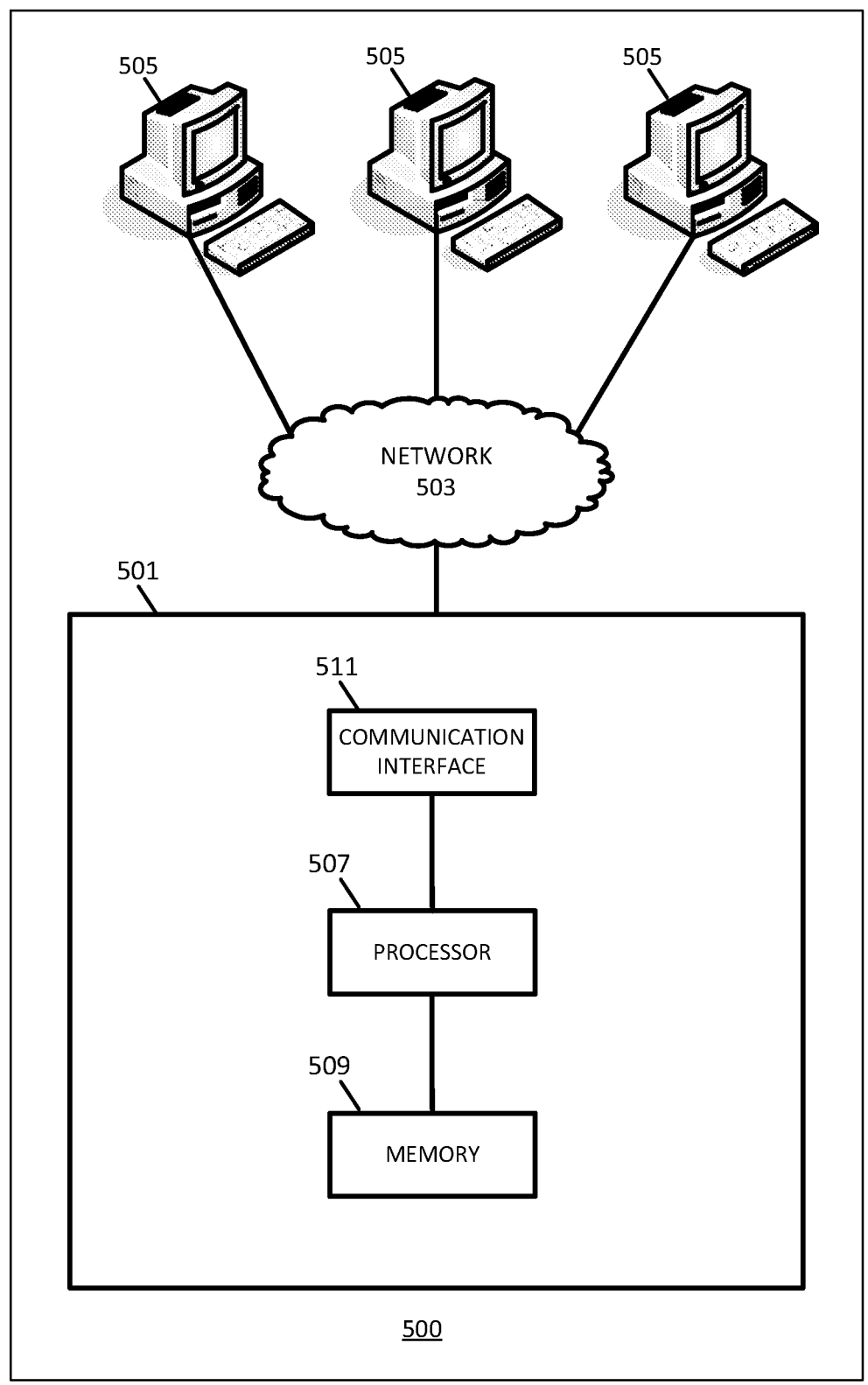
FIG. 5 illustrates another embodiment of a system for generating PLC code with a connectivity model.

The server 401 is configured to store a code entity (also referred to herein as a code model) for generating PLC code and a connectivity model for the multidisciplinary engineering system. The server receives code from other code entities or the automation designer application, engineered data from other code entities and application objects, and other information from the multidisciplinary engineering system for the code entity based on the connectivity model. The workstation 405 receives the code entity, the multidisciplinary information and code generation rules from the server 401 and/or the workstation 405 generates PLC code based on the received information and code generation rules. Alternatively, as illustrated in FIG. 5, the server 501 generates PLC code based on the received information and code generation rules. The server 501 transmits the generated PLC code to a workstation 505. In yet another alternative, the server 401 is implemented by one or more workstations 405 so that one or more of the engineering applications host the server functions.

The server 401 is configured to store code entities for generating PLC code. For example, one or more code entities are added to the multidisciplinary engineering system using Teamcenter application 309. For example, the Teamcenter application 309 can be hosted on the Siemens TIA Portal. Alternatively, code entities may be added using a different application. Additionally, one or more code entities may be created during a previous or subsequent code generation process. Existing code entities may be changed or updated in the server 401. The code entities are configured to receive code, engineered data and other information from the multidisciplinary system. The process of receiving code, engineered data and other information is referred to as enriching the code entities.

Figure 6:
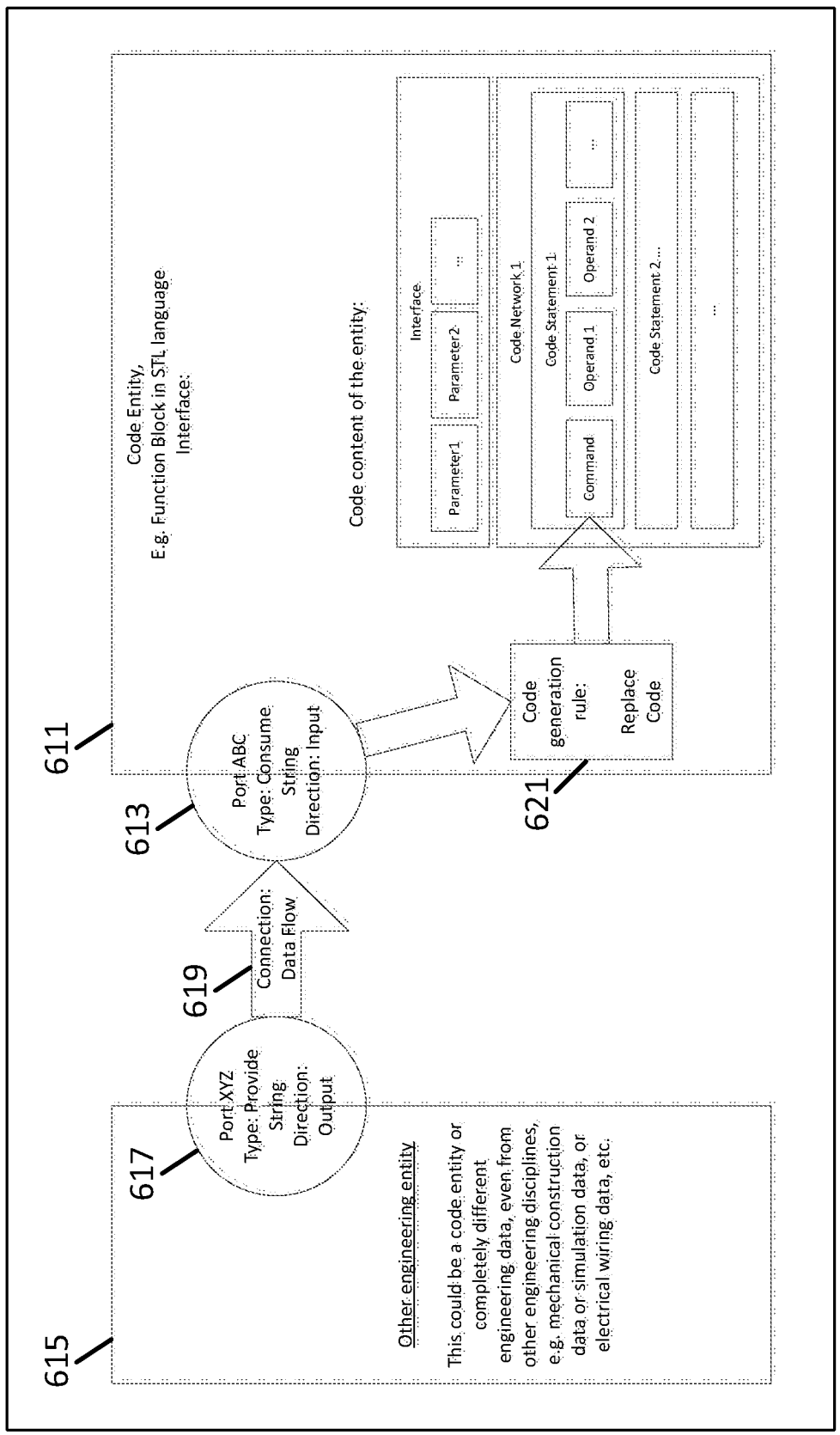
FIG. 6 illustrates an example implementation of code entities and other engineering entities in a connectivity model.

FIG. 6 an example implementation of code entities and other engineering entities in a connectivity model. The code entity 611 represents a software function block in the Structured Text Language (STL) PLC programming language. Other programming languages may also be used. The code entity 611 includes software contents including, but not limited to, software interfaces, parameters and code statements. For example, the code entity 611 includes an Interface for Parameter1 and Parameter2. The code entity 611 also includes a Code Network 1 that includes Code Statement 1 and Code Statement 2. Code Statement 1 includes a Command, Operand1 and Operand2. Additional, different, or fewer components may be provided. Any code entity representation may be used.

The server 401 is configured to store a connectivity model for the multidisciplinary engineering system. The connectivity model includes ports, connections and connection rules. The ports in the connectivity model are also referred to as interfaces, connection points and connectivity points, and indicate a potential to connect with another aspect of the multidisciplinary engineering system. Each port includes information about the port, such as the name of the port, the type of the port, the direction of the connection (i.e., input or output) and the allowed cardinality. Each port has a behavior associated with the port that includes the compatibility with other ports in the multidisciplinary engineering system, such as compatible port types, compatible port directions and compatible cardinality. The ports access the internal aspects of the code entities, application objects, engineering data or other aspects in the multidisciplinary engineering system. When ports are connected, the ports allow the connected code entities and application objects to access the internal aspects of the code entities and/or the application objects. Additionally, the ports allow the connected code entities and application objects to modify the referred internal aspects of the code entities during the code generation process according to the connections. The behavior of each port depends on the direction and type of the port.

Ports can be added to new and existing code entities, application objects, engineering data or other aspects in the multidisciplinary engineering system and can be used as a point of connectivity at a later time. The ports are added by the user, or alternatively, the ports are automatically added based on the data structure of the multidisciplinary engineering system, the connection rules in the connectivity model, or a combination thereof.

For example, referring to FIG. 6, the code entity 611 has a port 613. The code entity 611 may be associated with a PLC that will control a conveyor in an assembly plant. The port 613 includes information about the port 613. The port 613 is named Port ABC. The type of port 613 is to consume a String and the direction of port 613 is an input to code entity 611. FIG. 6 also illustrates a port 617 for another engineering entity 615 in a multidisciplinary engineering system. The engineering entity 615 can be another code entity similar to code entity 611, an engineering application object, engineering data or any aspect of the multidisciplinary engineering system configured to store code, engineered data and other information in the multidisciplinary engineering. For example, port 617 includes information about the port 617. The port 617 is named Port XYZ. The type of port 617 is to provide a String and the direction of port 617 is an output from engineering entity 617. For example, port 613 may receive a code string from another code entity 615 associated with another PLC in the automation discipline via port 617. Alternatively, port 613 may receive a text string from an application object 615 associated with a different engineering application via port 617, such as the length of an up-line conveyor represented in the automation designer application. In both examples, the code entity 611 receives the string from port 617 via port 613.

The connection rules are used in configuring the ports and configuring connections between the ports in the connectivity model. The connection rules prescribe how the ports can be connected in an engineering context, such as in a project for the engineering of a car assembly line. For example, in a car assembly line, materials used in the assembly line may flow through the assembly line from one conveyor to a second conveyor. In the multidisciplinary engineering system, connection rules may be established allowing the automation design application to take advantage of the knowledge used to model the flow from the first conveyor to second conveyor in the multidisciplinary engineering system. For example, the automation design application uses connection rules to establish connections between ports in the multidisciplinary engineering system, such as ports in code entities in the automation discipline and application objects in other engineering disciplines. The connections between ports in the multidisciplinary engineering system allow the automation design application to reuse code entities, engineering data, application objects and the data structure to generate PLC code for the conveyors. Connection rules are also used to restrict how ports connect to other ports and to prevent incorrect connections from being established. For example, the connection rules restrict connections based on data-type. Referring to FIG. 6, the port 613 can establish a connection with port 617 because both port 613 and port 617 are configured to consume and provide string data. Additionally, connection rules indicate restrict connections based on port direction. Referring to FIG. 6, the port 613 can establish a connection with port 617 because port 613 is an input and port 617 is an output.

The connections in the connectivity model direct engineering data from one port to another in the multidisciplinary engineering system. Connections are established between ports in the connectivity model according to the connection rules. The connections establish a relationship between two ports and have a connection type according to the port type of from—and to—ports. For example, referring to FIG. 6, the connection 619 is established between port 613 and port 617. The connection is of the type Data Flow, because port 617 is configured to provide a string output to port 613 that is configure to consume a string input. The connections are user configurable and are established by the user. Alternatively, the connections are automatically established based on the data structure of the multidisciplinary engineering system, the connection rules in the connectivity model, or a combination thereof. The automatically established connections are also user configurable. Additionally, a consistency check is performed to warn the user if a connection has not been established, if any connections do not satisfy the connection rules and if the code generation process is complete.

For example, if multiple code entities are added to the automation design application at the same time, or if the automation design application had previously added code entities, then known connections are established based on the connectivity model. For example, the new code entities can reuse interface variables, global tags (e.g., from a tag table), local tags and calls to function blocks and other functions. For example, a portal configures code entities using ports and connections for reusing code for function blocks, functions, data blocks, global tags, local tags and interface variables. One or more programming languages may be used, such as Structured Text Language (STL). Other applications and portals may be used along with one or more PLC programming languages. One such port is the Siemens TIA Portal. In case of variable and tag ports, the connectivity model will store information about the data-type to restrict connections to ports with the same data-type. The automatically generated connections are user configurable and can be altered by the user.

The code entities are configured to receive code, engineered data and other information from the multidisciplinary engineering system based on the connectivity model. The code entities receive code, engineered data and other information from other code entities, application objects, engineering data or other aspects in the multidisciplinary engineering system. A workstation 405 is configured to generate PLC code using the code entity. The workstation 405 uses the received engineered data and a code generation rule stored with the code entity. Alternatively, as illustrated in FIG. 5, the server 501 generates PLC code based on the received information and code generation rules. The server 501 transmits the generated PLC code to a workstation 505.

The PLC code is generated using a code generation rule. Code generation rules prescribe what part of the code in a code entity will be altered during code generation and how the code entity will be altered. The code generation rule utilizes one or more ports with an input direction to accept one or more inputs used for code generation. For example, referring to FIG. 6, the code generation rule 621 utilizes the port 613 to accept a string input received from the port 617 through connection 619. In this example, port 613 may receive a code string from another code entity 615 associated with another PLC in the automation discipline via port 617. The code generation rule 621 replaces a code string in code entity 611 with the string received from code entity 615 via port 617. Alternatively, port 613 may receive a text string from an application object 615 associated with a different engineering application via port 617, such as the length of an up-line conveyor represented in the automation designer application. The code generation rule 621 replaces a variable in code entity 611 with the string received from code entity 615 via port 617.

The code generation rules have one or more characteristics that prescribe how the code entity will be altered. For example, the code generation rule is a direct code insertion or replacement from one port to another. The Direct Insert/Replace rule inserts or replaces the selected code with the input provided through the connectivity model (e.g., from a port and connection). For example, PLC code from another code entity can be reused by inserting the PLC code in the target code entity and/or replacing existing code in the target code entity with the PLC code. For instance, basic functionality of a PLC of the same type as a programmed PLC can reuse PLC code from the configured PLC via a direct insert or replace operation. Alternatively, the code generation rule can be a code insertion or replacement using the result of a calculation. The Calculation rule inserts or replaces the selected code with the result of a mathematical formula or logical operation using multiple inputs (e.g., from multiple ports and connections).

In another example, the code generation rule can be a code insertion or replacement defining a call. The Call Generation rule inserts or replaces selected code with a call to a different code entity (e.g., calling a function block). In this example, the call generation rule can be defined in the target entity receiving the call, such as a call to a function block by specifying one or more instance data blocks (e.g., the memory associated with the function block) for the function block. The instance data block is represented as an application object in the multidisciplinary engineering system, such as in the automation designer application, and includes ports or interfaces for calling the parameters and other data. Additionally, the instance data block is associated with the function block to provide memory scope for the function block. Multiple instance data blocks can also be connected to the Call Generation rule in order to insert or replace multiple calls in a code entity.

In another example, a code generation rule is a code insertion or replacement from an external script or executable code. The External Code rule uses an externally provided software program (e.g., a script or executable) as an input for code insertion or replacement. In this example, a PLC supplier or other third party may supply external code to be used with a PLC. The external code may be stored in a code entity or in an application object associated with the automation designer application. The external code is directly inserted into the target code entity or the external code directly replaces existing code in the target code entity (e.g., when the external code is updated by a supplier). Additional, different, or fewer code generation rules may be provided. Code generation rules may also be combined.

Figure 7:
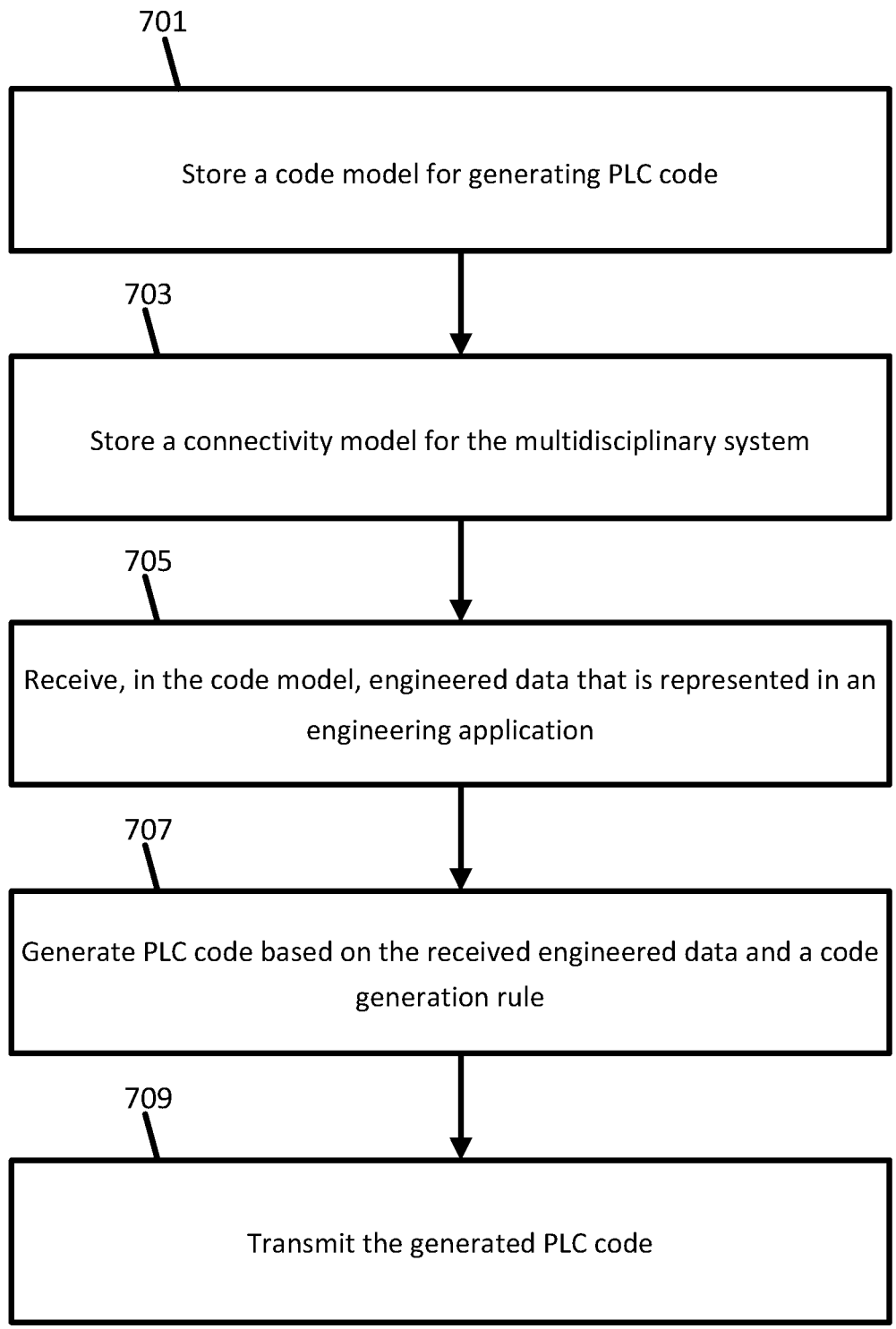
FIG. 7 is a flowchart diagram of one embodiment of a method for generating PLC code with a connectivity model.

FIG. 7 is a flowchart diagram of one embodiment of a method for generating PLC code with a connectivity model. The method is implemented by the system of FIG. 3, 4, 5 and/or a different system. A processor or group of networked processors perform the acts, such as pursuant to instructions, programming or circuit design. Additional, different or fewer acts may be provided. The method is provided in the order shown. Other orders may be provided and acts may be repeated.

At act 701, a code model for generating PLC code is stored on a server, workstation, computer, engineering application, or other location. More than one code model may be stored. The code model may also be referred to as a code entity.

At act 703, a connectivity model for the multidisciplinary system is stored on a server, workstation, computer, engineering application, or other location. More than one connectivity model may be stored. The connectivity model includes interfaces in the multidisciplinary engineering system, connection rules for the interfaces, and connections between the interfaces. The interfaces may also be referred to as ports. Each interface is associated with a code model, an engineering application object, engineered data, or other information in the multidisciplinary engineering system. The interfaces are established automatically. The automatically established interfaces are user configurable. Alternatively, the interfaces are established by the user and are user configurable. The connection rules restrict connections between the interfaces based on the data type and direction. For example, interfaces with unlike data types cannot be connected. Additionally, input interfaces can only connect to output interfaces, and vice versa. Connections between interfaces direct code, engineered data and other information from one interface to another. The connections satisfy the connection rules, allowing the interfaces to provide or consume engineered data to or from other interfaces according to the connections. The connections are automatically established. The automatically established connections are user configurable. Alternatively, the connections are established by the user and are user configurable.

At act 705, the code model receives information from the multidisciplinary engineering system based on the connectivity model. The code model receives code, engineered data and other information from another code model, an engineering application object, database or other aspect of the multidisciplinary engineering system. For example, referring to FIG. 6, port 613 may receive a code string from another code entity 615 associated with another PLC in the automation discipline via port 617. Alternatively, port 613 may receive a text string from an application object 615 associated with a different engineering application via port 617, such as the length of an up-line conveyor represented in the automation designer application. In both examples, the code entity 611 receives the string from port 617 via port 613.

At act 707, PLC code is generated by the server, workstation, computer and/or engineering application. The PLC code is generated based on the received information from the multidisciplinary engineering system and a code generation rule. More than one code generation rule may be used. The generated PLC code alters the code model, and the code generation rule has one or more characteristics that prescribe how the code model will be altered. For example, referring to FIG. 6, the code generation rule 621 utilizes the port 613 to accept a string input received from the port 617 through connection 619. In this example, port 613 may receive a code string from another code entity 615 associated with another PLC in the automation discipline via port 617. The code generation rule 621 replaces a code string in code entity 611 with the string received from code entity 615 via port 617. Alternatively, port 613 may receive a text string from an application object 615 associated with a different engineering application via port 617, such as the length of an up-line conveyor represented in the automation designer application. The code generation rule 621 replaces a variable in code entity 611 with the string received from code entity 615 via port 617.

The code generation rules have one or more characteristics that prescribe how the code entity will be altered. For example, the code generation rule is a direct code insertion or replacement from one interface to another. The Direct Insert/Replace rule inserts or replaces the selected code with the input provided through the connectivity model (e.g., from an interface and connection). For example, PLC code from another code entity can be reused by inserting the PLC code in the target code entity and/or replacing existing code in the target code entity with the PLC code. For instance, basic functionality of a PLC of the same type as a programmed PLC can reuse PLC code from the configured PLC via a direct insert or replace operation. Alternatively, the code generation rule is a code insertion or replacement using the result of a calculation. The Calculation rule inserts or replaces the selected code with the result of a mathematical formula or logical operation using multiple inputs (e.g., from multiple interfaces and connections).

In another example, the code generation rule is a code insertion or replacement defining a call. The Call Generation rule inserts or replaces selected code with a call to a different code model. In this example, a target entity can be defined for the call generation rule to receive the call as a function block and an instance data block (e.g., the memory associated with the function block).

In another example, a code generation rule is a code insertion or replacement from an external script or executable code. The External Code rule uses an externally provided software program (e.g., a script or executable) as an input for code insertion or replacement. In this example, a PLC supplier or other third party may supply external code to be used with a PLC. The external code may be stored in a code entity or in an application object associated with the automation designer application. The external code is directly inserted into the target code entity or the external code directly replaces existing code in the target code entity (e.g., when the external code is updated by a supplier). Additional, different, or fewer code generation rules may be provided. Code generation rules may also be combined.

At act 709, the generated PLC code is transmitted from the server, workstation, computer or engineering application to a server, workstation, computer and/or engineering application over a network. For example, generated PLC code is transmitted from a server to a workstation. The workstation receives the PLC code in an engineering application for use in PLC hardware. The PLC code may be ready for export and use by a target PLC, or additional acts may be performed by the workstation, such as additional programming specific to the target PLC. Further, a compilation act may be required before exporting the PLC code. The compilation act may be performed by an engineering application in the multidisciplinary engineering system, or by an application outside of the multidisciplinary engineering system. The PLC code is exported from the workstation to the target PLC. Alternatively, the server can transmit or export the PLC code directly to the target PLC.

Figure 8:
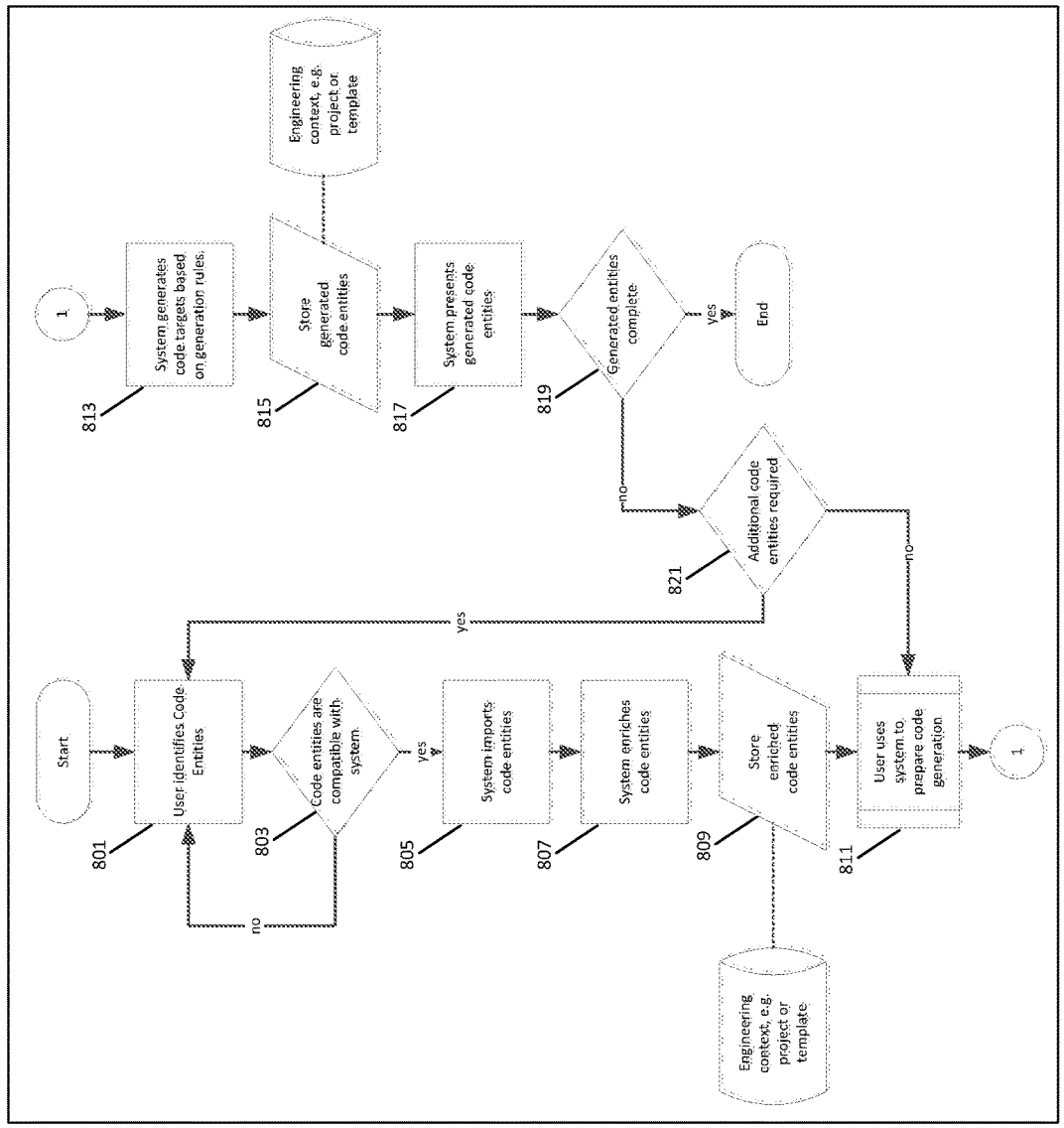
FIG. 8 is a flowchart diagram of another embodiment of a method for generating PLC code with a connectivity model.

FIG. 8 is a flowchart diagram of another embodiment of a method for generating PLC code with a connectivity model. The method is implemented by the system of FIG. 3, 4, 5 and/or a different system. A processor or group of networked processors perform the acts, such as pursuant to instructions, programming or circuit design. Additional, different or fewer acts may be provided. The method is provided in the order shown. Other orders may be provided and acts may be repeated.

At act 801, a user identifies code entities in the multidisciplinary engineering system. The code entities are identified on a server, workstation, computer, engineering application, or other location. In one example, the identified code entities were configured by the user. Alternatively, the code entities were configured automatically and the user identifies code entities from the automatically configured code entities. In another example, the code entities are preexisting and the user identifies code entities from the preexisting code entities. For example, the user configures the code entities that are to be changed or created during the code generation process. Code entities are configured using the multidisciplinary engineering system, for example from a portal hosted on a server. The code entities include ports for connecting with other aspects of the multidisciplinary engineering system, such as ports in code entities in the automation discipline and application objects in other engineering disciplines. The user adds connections between ports that are automatically connected and adds additional connections to ports according to their cardinality requirements. Similarly existing connections can be removed and/or connections can be altered by the user.

At act 803, the multidisciplinary engineering system determines whether the code entities are compatible with the multidisciplinary engineering system. For example, multidisciplinary engineering system checks to determine whether the code entities conform to the programming language compatible with the PLC device. In this example, the programming language type and version are checked. In another example, the use of PLC device specific functions are checked. Further, the memory size of the PLC device is checked for compatibility. In another example, any connections made will be checked for compatibility in terms of port type, port direction and cardinality. If an inconsistency is detected, the system will warn the user and/or provide an error. If the code entities are not compatible with the multidisciplinary engineering system, act 801 is repeated. If the code entities are compatible with the multidisciplinary engineering system, act 805 is performed.

At act 805, the identified code entities are imported into the multidisciplinary engineering system. The imported code entities are stored on a server, workstation, computer, engineering application, or other location.

At act 807, the identified code entities are enriched. The code entities are enriched by receiving code, engineered data and other information from the multidisciplinary system. The type and form of the code, engineered data and other information received is dependent on the connectivity model for the multidisciplinary engineering system. In an engineering context, additional acts can be performed to provide scope for the code generation process. The user can alter engineering information received through a port and connection to provide a scope of the code generation process. For example, the user can define target PLC systems. In this manner, the user assigns sub-structures of the project to a specific PLC hardware and defines code generation rules for all the code entities in the sub-structure. For example, one sub-structure in a project pertains to automating the local functions of a conveyor, the sub-structure utilizing engineering data associated with to the conveyor only. A second sub-structure pertains to automating a group of conveyors to work with each other. Depending on the scope or context of the sub-structure, the multidisciplinary engineering system establishes additional connections automatically, using global tags (e.g., from a tag table), data block tags that are used from a known global data blocks and calls to function blocks and functions. For example, the tags are references to system memory locations and are grouped together in tag tables for easier management. Each tag includes a name and a data type. At runtime, each tag is used to reference data or a value stored in memory that is used in the PLC program. For example, the tags reference data stored in global memory, such as a memory position for storing data for the physical input or output signals. Further the tags are used when calling function blocks in order to transfer data to the code entities. Tags can also reference the system memory locations storing the code entities. The automatically generated connections can be altered by the user if necessary.

For example, one engineering context for generating PLC code is to generate code for operating each conveyor on the factory assembly line independent of the other devices on the assembly line. A second engineering context for generating PLC code is to generate code for the interactions between two conveyors on the assembly line. For example, a down line conveyor receives the length and speed of an up line conveyor to generate PLC code for material flow from the up line conveyor to the down line conveyor. The system will ensure that the information used to enrich the code entities is provided to the code generation rules without requiring additional user interaction via the ports and connections in the connectivity model, such as by utilizing a PLC tag that is connected via a port and connection.

At act 809, the multidisciplinary engineering system stores the enriched code entities. The enriched code entities are stored on a server, workstation, computer, engineering application, or other location.

Figure 9:
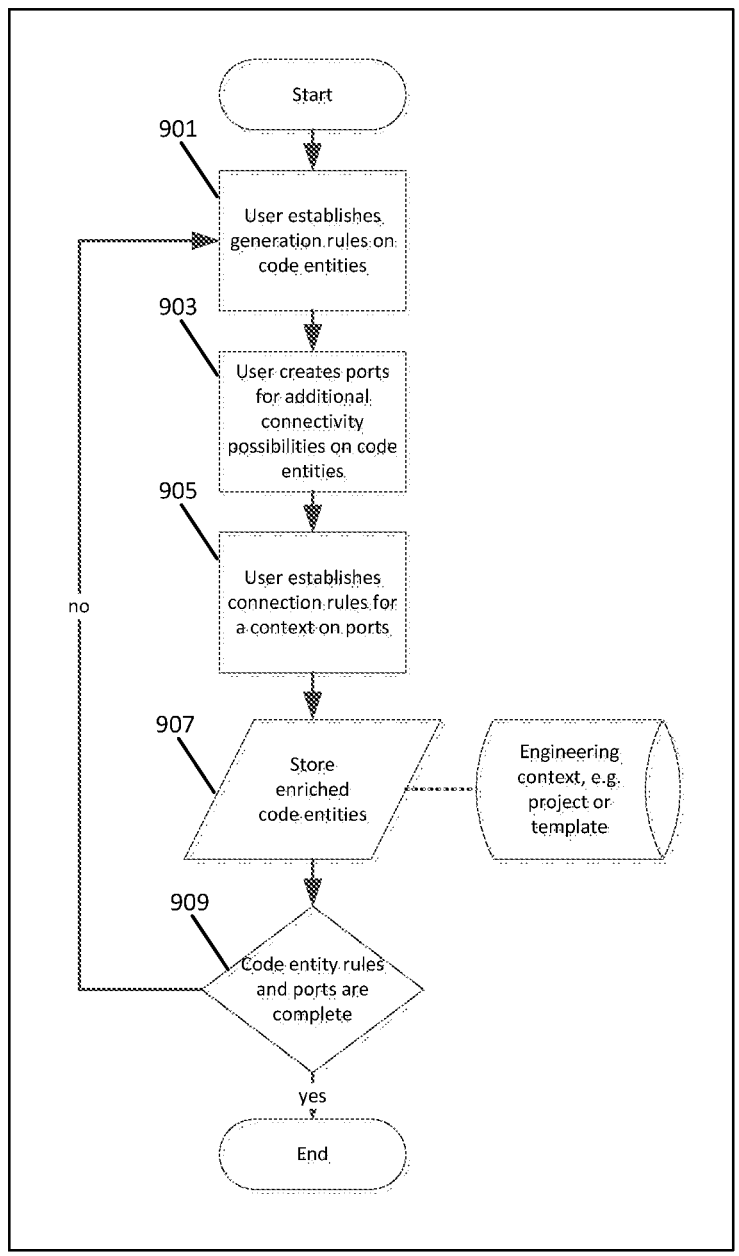
FIG. 9 is a flowchart diagram of a preparation for code generation sub-flow of a method for generating PLC code with a connectivity model.

At act 811, the user uses the multidisciplinary engineering system to prepare the identified code models for code generation. For example, FIG. 9 is a flowchart diagram for preparation for code generation sub-flow of a method for generating PLC code with a connectivity model. At act 901, the user establishes code generation rules on the code entities. At act 903, the user creates ports for additional connectivity possibilities on the code entities. The ports identify the information from the multidisciplinary engineering system to be used during code generation. At act 905, the user establishes connection rules for a context on the ports. The connection rules link the information from the multidisciplinary engineering system to the identified code models. At act 907, the user stores the enriched code entities. At act 909, a determination is made whether the code entity rules and ports are complete, such as when an engineer has configured each target code entity. If the code entity rules and ports are not complete, acts 901 through 909 are repeated. If the code entity rules and ports are complete, then the preparation for code generation sub-flow is complete.

Figure 10A:
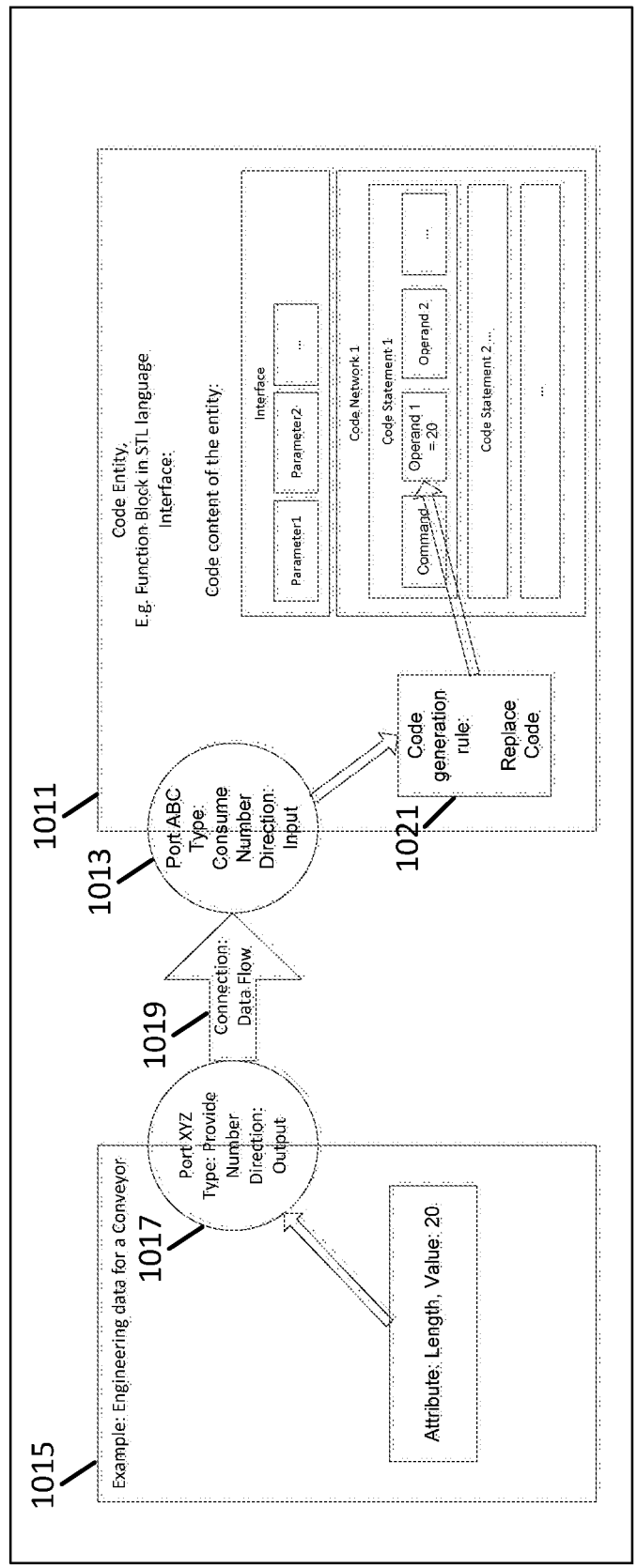
FIGS. 10A and 10B illustrate an example implementation of using a connectivity model with altered engineering data.
Figure 10B:
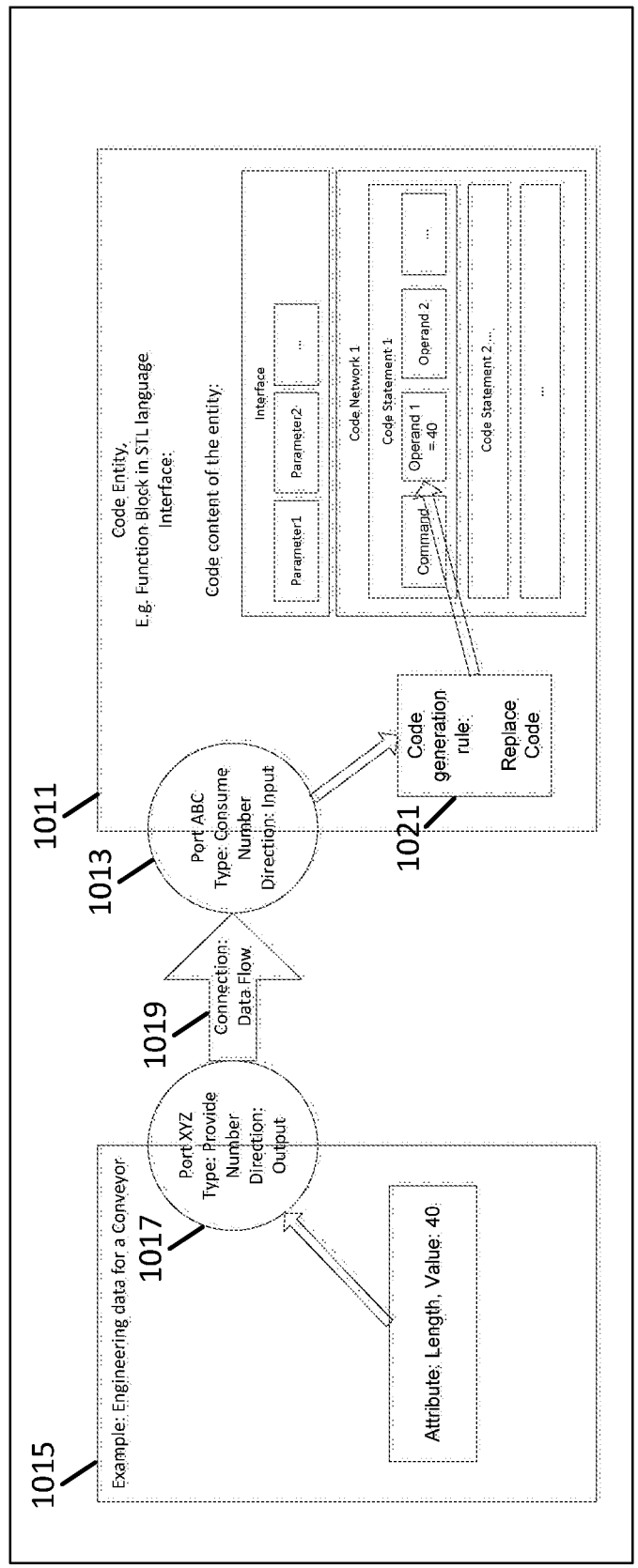

For example, FIGS. 10A and 10B illustrate an example implementation of using a connectivity model with altered engineering data. For example, the code entity 1011 in FIG. 10A is enriched with information from an aspect from the multidisciplinary engineering system. The code entity is enriched with engineering data from a conveyor 1015 via a connection 1019 between a port 1013 in the code entity 1011 and a port 1017 to the engineering data 1015. The code generation rule 1021 in the code entity 1011 uses the engineering data 1015, consisting of a value for an attribute of the conveyor, length having a value of 20. The code generation rule replaces the operand 1 with the received length value. In FIG. 10B, the length of the conveyor is altered from a value of 20 to a value of 40. The code entity is enriched with the altered engineering data, and the code generation rule 1021 replaces the operand 1 with the altered length value.

Figure 11:
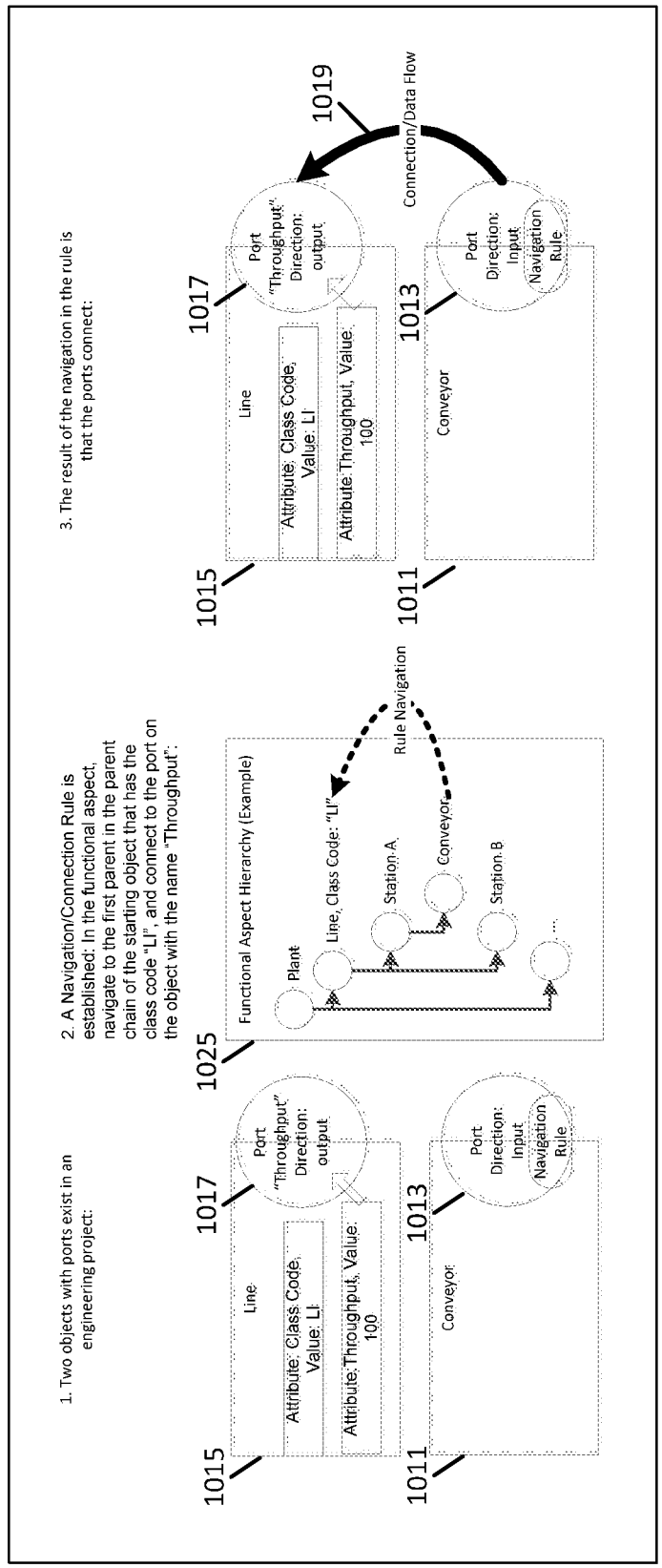
FIG. 11 illustrates an example implementation of connection rules in a connectivity model.

For example, connection rules can take advantage of an IEC 81346 compliant engineering system that organizes multidisciplinary engineering data in multiple dimensions, also called "aspects" and derives ports and connections from the hierarchical data structure. In this example, a connection or navigation rule is provided that navigates the data structure as shown in FIG. 11. In act 1, an application object 1015 from the line design application and a code entity 1011 for a conveyor exist in the multidisciplinary engineering system. In act 2, a connection rule is established that navigates the data hierarchy 1025 by navigating to the first parent of the conveyor code entity 1011. The starting object designation has an attribute class code "LI" and a "Throughput" value of 100. In act 3, the multidisciplinary engineering system uses the data hierarchy 1025 to automatically generate a connection 1019 between the port 1017 of application object 1015 from the line design application and the port 1013 from the code entity 1011.

Figure 12:
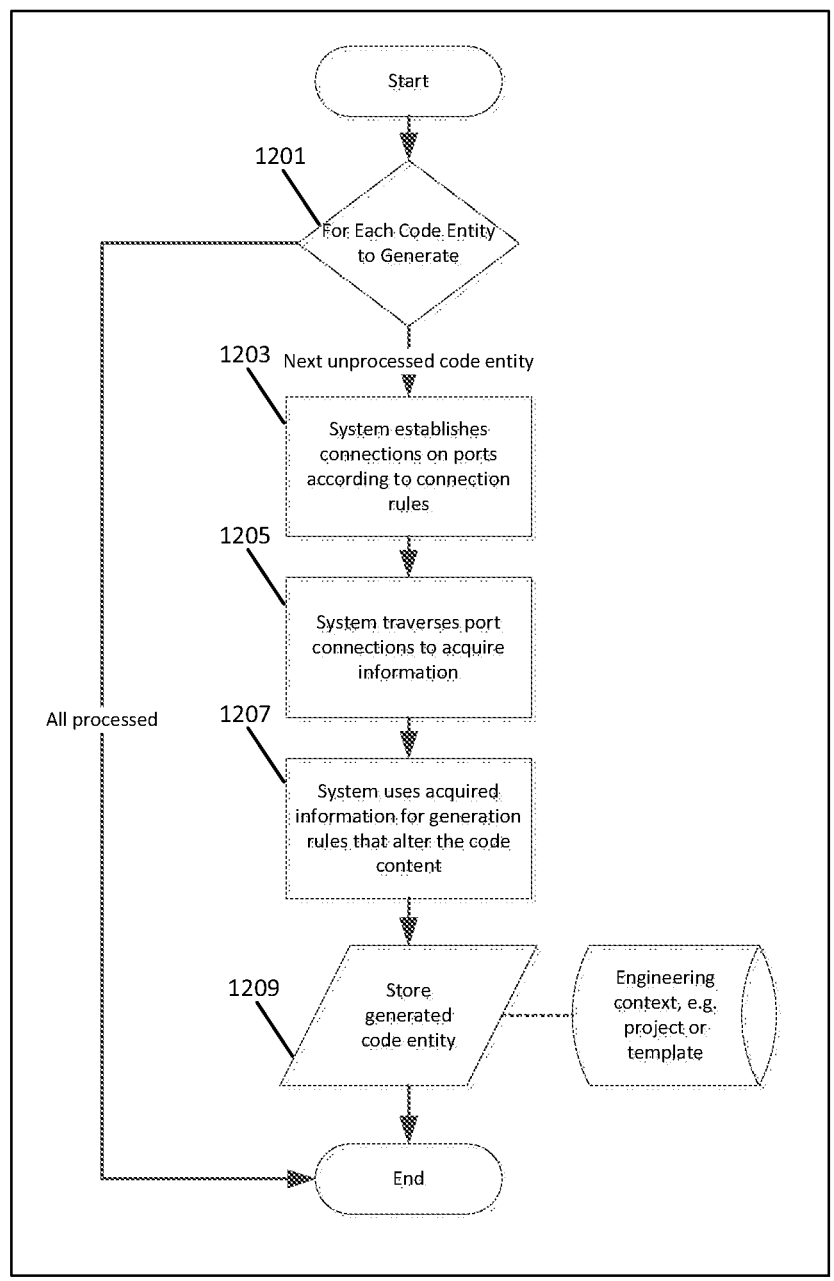
FIG. 12 is a flowchart diagram of a code generation sub-flow of a method for generating PLC code with a connectivity model.

At act 813, the multidisciplinary engineering system generates PLC code targets for the identified code models based on the code generation rules. For the example, the generated PLC code alters the networks, tags, statements, operands or any selected code text in the target code model. For example, FIG. 12 is a flowchart diagram of a code generation sub-flow of a method for generating PLC code with a connectivity model. At act 1201, the multidisciplinary engineering system determines if each code entity has been processed. If there is an unprocessed code entity, then act 1203 is performed. At act 1203, the multidisciplinary engineering system establishes connections on ports according to the connection rules. At act 1205, the multidisciplinary engineering system traverses the port connections to acquire information from the multidisciplinary engineering system. At act 1207, the multidisciplinary engineering system uses the acquired information with the code generation rules to alter the code entity. At act 1209, the multidisciplinary engineering system stores the generated code entity in the multidisciplinary engineering system.

At act 815, the multidisciplinary engineering system stores the generated code and/or code entities in the multidisciplinary engineering system. At act 817, the multidisciplinary engineering system presents the generated code and/or code entities. The generated PLC code is exported from the multidisciplinary engineering system to PLC hardware. The PLC is exported from the server, workstation, computer and/or engineering application. Further, a compilation act may be required before exporting the PLC code. The compilation act may be performed by an engineering application in the multidisciplinary engineering system, or by an application outside of the multidisciplinary engineering system.

At act 819, the multidisciplinary engineering system determines if the generated code entities are complete, such as when PLC code has been generated for each target code entity configured. If the generated code entities are not complete, act 821 is performed. At act 821, the multidisciplinary engineering system determines if additional code entities are required. If additional code entities are required, then act 801 is repeated. If no additional code entities are required, then act 811 is repeated.

As disclose herein, the data structure in the multidisciplinary engineering system is reusable, meaning the engineered data can be stored in a library context and reused in an engineering project many times. Each time the engineered data is reused, the data structure reuses prepared code entities including the generation rules, ports and connections. However, using ports to provide and consume data along with connections to connect engineering data is not limited to the described system and method of code generation, but can be applied in a broader way to all kinds of engineered data. The code generation system can reuse data in the code generation process that is from code entities and other engineering data locations, including engineering data locations in other engineering disciplines. For example, an attribute value of a conveyor describing the length of the conveyor could be used as a default value for a variable (e.g. for a DB variable) as a constant value in PLC code.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. A method for generating programmable logic controller (PLC) code based on a connectivity model in a multidisciplinary engineering system, the method comprising:
storing 701, by a server 301, a code model 611 for generating PLC code;
storing 703, by the server 301, the connectivity model for the multidisciplinary system, the connectivity model comprising:
a plurality of interfaces 613 and 617 between different engineering applications in the multidisciplinary engineering system, wherein each of the interfaces 613 is associated with the code model and engineered data represented in one of the different engineering applications for a different engineering discipline with a different role in the multidisciplinary engineering system;
connection rules for each of the plurality of interfaces 613 and 617 that restrict connection of a first interface to a second interface based on data type and connection direction of the first interface and the second interface;
connections 619 between the plurality of interfaces 613 and 617 satisfying the connection rules, wherein the plurality of interfaces 613 and 617 transmit or receive engineered data to other ones of the plurality of interfaces 613 and 617 according to the connections 619;
receiving 705, by the code model 611, the engineered data represented in the different engineering applications, the receiving being based on the connectivity model;
generating PLC code 707, using the code model 611, based on the received engineered data and a code generation rule 621; and
transmitting 709, with the server 301 over a network 303, the generated PLC code to a computer 305.

2. The method of claim 1 wherein generating the PLC code comprises generating with the code generation rule 621 being a direct code insertion or replacement from one interface 617 to another interface 613.

3. The method of claim 1 wherein generating the PLC code comprises generating with the code generation rule 621 being a code insertion or replacement with the result of a calculation using the engineered data received from two or more interfaces 617.

4. The method of claim 1 wherein generating the PLC code comprises generating with the code generation rule 621 being a code insertion or replacement defining a call.

5. The method of claim 1 wherein generating the PLC code comprises generating with the code generation rule 621 being a code insertion or replacement with an external script or executable code.

6. The method of claim 1 wherein the connections 619 are automatically established.

7. The method of claim 1 wherein the connection rules restrict connections 619 based on data-type.

8. The method of claim 1 wherein the connection rules indicate whether each interface 613 and 617 is an input or an output and a cardinality for each interface 613 and 617.

9. The method of claim 1 wherein receiving the engineered data comprises receiving data from another code model 615.

10. A multidisciplinary engineering system for generating programmable logic controller (PLC) code based on a connectivity model, the system comprising:
a server 301 configured to:
store 701 a code model 611 for generating PLC code;
store 703 the connectivity model for the multidisciplinary system, the connectivity model comprising:
a plurality of connection points 613 and 617 between different engineering applications in the multidisciplinary engineering system, wherein each of the connection points 613 and 617 is associated with one of the following:
the code model 611; or
engineered data represented in one of the different engineering applications for a different engineering discipline with a different role in the multidisciplinary engineering system;
connection rules for each of the plurality of connection points 613 and 617 that restrict connection of a first interface to a second interface based on data type and connection direction of the first interface and the second interface;
connections 619 between the plurality of connection points 613 and 617 satisfying the connection rules, wherein the plurality of connection points 613 and 617 transmit or receive engineered data to other ones of the plurality of connection points 613 and 617 according to the connections 619;
the code model 611 configured to receive the engineered data represented in the different engineering applications based on the connectivity model; and
a workstation 305 configured to:
generate PLC code, using the code model 611, based on the received engineered data and a code generation rule 621.

11. The system of claim 10 wherein the code generation rule 621 provides that the received engineered data is directly inserted into or replaces code in the code model 611.

12. The system of claim 10 wherein the code generation rule 621 provides that the result of a calculation using the engineered data received from two connection points 617 is inserted into or replaces code in the code model 611.

13. The system of claim 10 wherein the code generation rule 621 provides that a call is inserted into or replaces code in the code model 611.

14. The system of claim 10 wherein the code generation rule 621 provides that an external script or executable code is inserted into or replaces code in the code model 611.

15. The system of claim 10 wherein the connectivity rules are based on the data structure for the different engineering applications of the multidisciplinary engineering system stored on the server 301.

16. The system of claim 10 wherein the connectivity rules 621 dictate whether each of the plurality of connection points 613 and 617 is an input or an output.

17. A method for generating programmable logic controller (PLC) code based on a connectivity model in a multidisciplinary engineering system, the method comprising:
storing 701, with a server 301, a plurality of code models 611 for PLC hardware;
identifying 801 at least one of the plurality code models 611 for receiving PLC code;
preparing 811 the identified code models 611 for code generation comprising:
configuring 901 code generation rules for identified code models 611;
identifying 903 engineered data to be used during code generation, wherein the engineered data is represented in different engineering applications for different engineering disciplines with different roles in the multidisciplinary engineering system; and
linking 905 the identified engineered data to the identified code models, wherein the linking comprises an interface 613 for each of the identified code models 611, an interface 617 for each of the identified engineered data 615 and connections between interfaces 619 that restrict connection of a first interface to a second interface based on data type and connection direction of the first interface and the second interface;
generating 813 PLC code for the identified code models 611;
storing 815 the generated PLC code in the identified code models 611; and
exporting 709 the generated PLC from the server 301 to the PLC hardware.

18. The method of claim 17 where generating PLC code for the identified code models comprises:
receiving 1205 the linked engineered data from the different engineering applications; and
applying 1207 a code generation rule 621 using the received engineered data.

19. The method of claim 17 wherein exporting 709 the generated PLC code exports the code via a workstation computer 305.

* * * * *